Patented Feb. 16, 1943

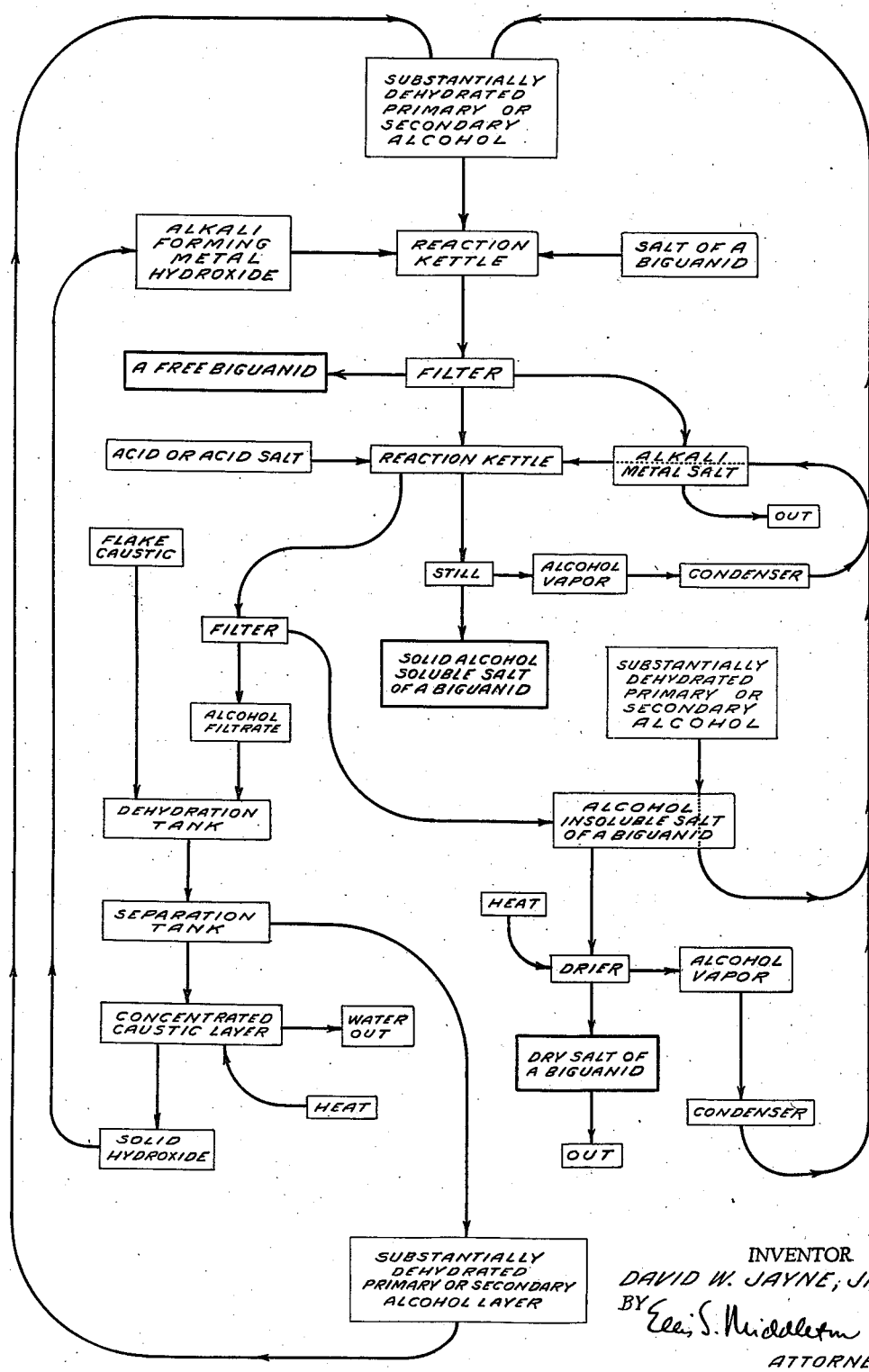

2,311,295

UNITED STATES PATENT OFFICE 2,311,295

PREPARATION OF BIGUANIDS

David W. Jayne, Jr., Old Greenwich, Conn., assignor to American Cyanamid Company, New York, N. Y., a corporation of Maine Application March 1, 1941, Serial No. 381,252

5 Claims. (Cl. 260—564)

The present invention relates to the preparation of a free biguanid and to the conversion thereof to biguanid salts, the latter by means of a cyclic process.

The invention is particularly concerned with the production of such materials by a convenient method so as to obtain the products in a reasonable state of purity with optimum yields.

The interesting observation has been made that free biguanids are soluble in water-soluble primary and secondary alcohols while alkali-forming metal inorganic salts are not. The further observation has been made that a biguanid may be released from its salts by the use of an alkali stronger than the biguanid, for instance, the alkali-forming metal hydroxides.

As a consequence of these observations, it is possible to react a biguanid salt and an alkali-forming metal hydroxide in a substantially dehydrated primary or secondary alcohol. As a result of this reaction, a free biguanid is formed which immediately dissolves in the alcohol while the simultaneously produced alkali metal salt is precipitated. Thus by a simple filtration, the two may be separated and the free biguanid recovered as such from the alcohol filtrate. This is a particularly desirable method of recovering a free biguanid as compared to its recovery from water solutions by reason of the fact that comparatively high temperatures are not necessary and, consequently, decomposition is avoided.

In this phase of the invention, it is to be clearly understood that any substantially dehydrated primary or secondary alcohol may be used, of which methyl, ethyl, normal-propyl, isopropyl, normal-butyl, secondary butyl and isobutyl alcohols are preferred examples. It is, of course, desirable that the alcohol used in the process be substantially dehydrated in order to avoid a water solution of the biguanid and also a water solution of the alkali-forming metal salt, to any substantial extent.

Again it is to be understood that any salt of a biguanid may be used in this reaction, although the cheaper ones are preferred, such as biguanid sulfate, ethyl biguanid hydrochloride, phenyl biguanid nitrate, ortho tolyl biguanid hydrochloride and the like.

As to the alkali used to free the biguanid from its salts, one must be used which has an alkalinity stronger than the biguanid. For this reason, the hydrates of sodium and potassium are preferred, although the hydroxides of any of the alkali-forming metals are reasonably useful.

In the second phase of the invention, the free biguanid either in alcoholic solution or in a dry state recovered therefrom, although preferably the former, may be used as a starting material for a cyclic method of converting the free biguanid to a salt thereof.

The above procedure is particularly desirable where the free biguanid is produced through reaction between an alkali-forming metal hydroxide and a biguanid salt in a medium of a substantially dehydrated primary or secondary alcohol.

For instance, an alcoholic solution of the free biguanid as above produced, may be reacted with an acid or an acid salt to produce the desired biguanid salt. Those salts of a biguanid which are substantially insoluble in primary and secondary alcohols, are precipitated from the reaction menstruum and may be removed by a simple filtration operation. Thus, beginning with a cheap available salt of a biguanid, one may readily convert the same to a different biguanid salt with minimum difficulties, in good yields and in a good state of purity.

The entire method may be made cyclic if the alcoholic filtrate resulting from the separation of the thus produced biguanid salt is subjected to substantial dehydration, as by adding thereto a sufficient amount of a solid, substantially dry alkali-forming metal hydroxide. This caustic material substantially dehydrates the alcohol and upon permitting the mixture to stand, stratifies. The upper layer is substantially dehydrated alcohol which may then be returned to the cycle as reaction medium for freeing additional quantities of a biguanid. The lower and heavily concentrated layer of caustic may, after water removal, also be returned to free additional quantities of a biguanid from its salts.

As a consequence of the above, the two phases of the invention are very definitely tied in together in a cyclic manner with minimum losses, both the recovered caustic and the alcohol being returned to the cycle for additional runs. Thus a smoothly running, economical method results.

Where the above-formed biguanid salt is soluble in the alcohol, it may be recovered by distilling the latter therefrom and returning the same, after dehydration if desired, to the cycle. Thus a cyclic process results even where soluble biguanid salts are produced.

The invention is more particularly illustrated in the flow sheet which diagrammatically illustrates a completely cyclic procedure.

Referring now to the flow sheet, it will be seen that it is proposed to react a biguanid salt with an alkali-forming metal hydroxide in a medium of a substantially dehydrated primary or secondary alcohol. As a result of this reaction, there is formed the free biguanid which dissolves in the alcohol and an alkali-metal salt which is precipitated. The latter is filtered and the cake may be washed with additional quantities of primary or secondary alcohol to free the salt from any of the adherent biguanid. The alcoholic solution of the biguanid may then be evaporated at atmospheric or reduced pressure as the case may be to recover the free biguanid in solid form and in a good state of purity.

In the event that the alcoholic solution of a biguanid is to be used for the production of a salt of a biguanid other than that used in the start of the process, it may be reacted with an acid or acid salt to form the corresponding biguanid salt. Where this latter substance is insoluble in the alcohol, it may be filtered out and recovered with appropriate washing where desired. The new biguanid salt, wet with alcohol, may be dried so as to recover the adherent alcohol which can then be returned to the cycle.

Where the thus produced biguanid salt is soluble in the alcohol, it may be recovered as such by simple evaporation of the solvent.

The alcoholic filtrate, no longer dehydrated by reason of the presence of chemical water therein, may then be substantially dehydrated by adding thereto solid caustic preferably in the form of alkali-forming metal hydroxide. Upon permitting this mixture to stand, stratification takes place with the formation of two layers. The upper one is the substantially dehydrated alcohol which can be returned to the start of the cycle. The lower layer is heavily concentrated water solution of caustic which may be returned to the cycle as such or where desired, may be further concentrated to remove a part or all of its contained water.

*Example I*

100 grams of phenyl biguanid hydrochloride is slurried in 200 cc. of anhydrous 2-B alcohol (the technical designation of a substantially anhydrous mixture of ethyl alcohol containing .5% benzene) and a solution of 29 grams of 88% KOH in 120 cc. of 2B alcohol added to the solution with good agitation. The mix is then warmed to 50° C. and after the reaction is complete, cooled to room temperature. The resulting slurry is filtered to remove the potassium chloride and the cake washed with alcohol. The filtrate is then evaporated on a steam bath until practically all of the alcohol is driven off, condensed and recovered and a sticky resinous material results. Upon cooling to room temperature and covered with ether, it loses its resinous character and becomes a white, lumpy, brittle mass. The lumps may be ground, slurried in ether and filtered and the cake washed with ether and dried. The product, phenyl biguanid base, is a dry white powder, 98.7% pure. The recovered alcohol may be returned to the cycle.

*Example II*

A 2-B solution of free phenyl biguanid prepared as, for instance, by the method of Example I, is saturated with $CO_2$ and the resulting clear solution of phenyl biguanid carbonate evaporated, with recovery and recycling of the alcohol. The resultant sticky resinous carbonate, upon cooling and treatment with ether, yields phenyl biguanid carbonate as a dry, white powder 98.2% pure.

*Example III*

100 grams of ortho tolyl biguanid sulfate are slurried in 200 cc. of substantially anhydrous 2-B alcohol to which is added 27 grams of 88% KOH in 120 cc. of substantially anhydrous 2-B alcohol and the mix warmed to 50° C. After the reaction is complete and the mixture cooled, the precipitated calcium sulfate may be removed by a simple filtration operation. The alcoholic solution of ortho tolyl biguanid base may be recovered from the filtrate by simple evaporation of the alcohol, the residual solvent being removed by means of ether. By condensing the evaporated alcohol, substantial quantities thereof may be recovered and recycled.

*Example IV*

A 2-B alcohol solution of ortho tolyl biguanid base prepared, for instance, as in Example III, upon treatment with dry HCl until acid to litmus, causes a precipitation of ortho tolyl biguanid hydrochloride. This may be filtered, dried and recovered as a solid salt. The alcoholic filtrate may be readily dehydrated by adding a sufficient quantity of substantially dry KOH thereto, the mix being permitted to stratify. The upper layer of substantially dehydrated alcohol may be returned to the cycle, and the lower concentrated caustic layer, after dehydration, returned to the process.

*Example V*

100 grams of biguanid nitrate are slurried in 200 cc. of secondary butyl alcohol to which is added 39 grams of NaOH in 200 cc. of secondary butyl alcohol and the mix warmed to 50° C. When the reaction is complete, upon cooling, potassium nitrate is precipitated, which may then be filtered. The free biguanid base may be recovered by distilling the alcohol therefrom, the latter being returned to the cycle.

*Example VI*

A secondary butyl alcoholic solution of free biguanid prepared, for instance, as in the last example, is treated with 100 grams of benzene sulfonic acid. This causes precipitation of biguanid benzene sulfonate which may be recovered by filtration. The no longer dehydrated butyl alcohol is then treated with flake caustic soda and after agitation, permitted to stratify. The upper layer of substantially dehydrated secondary butyl alcohol is returned to the cycle while the lower concentrated caustic layer, after dehydration, again enters the system.

In like manner, other free biguanids and their salts, both soluble and insoluble in primary or secondary alcohol may be similarly produced and recovered inasmuch as the above methods are applicable to all members of the class.

While the invention has been shown and described with particular reference to specific embodiments, it is to be understood that it is not to be limited thereto but is to be construed broadly and restricted solely by the scope of the appended claims.

I claim:

1. A method of preparing a free biguanid which comprises reacting an alkali-forming metal hydroxide with an inorganic salt of a biguanid in the presence of a substantially anhydrous alcohol chosen from the group consisting of primary and secondary alcohols and filtering off the insoluble alkali metal salt.

2. A method of preparing a free biguanid which comprises reacting an alkali-forming-metal hydroxide with an inorganic salt of a biguanid in the presence of a substantially anhydrous alcohol chosen from the group consisting of primary and secondary alcohols and filtering off the insoluble alkali-metal salt, and recovering the free biguanid from the filtrate.

3. The method of claim 1 in which the hydrate is that of sodium.

4. The method of claim 1 in which the alcoholic medium is ethyl alcohol.

5. The method of claim 1 in which the hydrate is of sodium and the alcoholic medium is ethyl alcohol.

DAVID W. JAYNE, Jr.